(12) United States Patent
Mattimore et al.

(10) Patent No.: US 8,380,550 B2
(45) Date of Patent: Feb. 19, 2013

(54) METHOD AND COMPUTER PROGRAM PRODUCT FOR MAINTENANCE AND MODERNIZATION BACKLOGGING

(75) Inventors: Bernard G. Mattimore, Danville, CA (US); Paul E. Reynolds, Ripon, CA (US); Jill M. Farrell, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 332 days.

(21) Appl. No.: 12/633,656

(22) Filed: Dec. 8, 2009

(65) Prior Publication Data

US 2011/0137693 A1     Jun. 9, 2011

(51) Int. Cl.
*G06Q 10/00* (2012.01)
(52) U.S. Cl. .................................... 705/7.11
(58) Field of Classification Search ............. 705/7.11
See application file for complete search history.

(56) References Cited

U.S. PATENT DOCUMENTS

| | | | |
|---|---|---|---|
| 5,648,919 A * | 7/1997 | Yamauchi et al. | 703/6 |
| 6,110,214 A * | 8/2000 | Klimasauskas | 703/2 |
| 7,734,488 B2 * | 6/2010 | Grussing et al. | 705/7.13 |
| 2009/0106292 A1 * | 4/2009 | Kaufman et al. | 707/102 |

OTHER PUBLICATIONS

Lee, A cost/benefit model for investments in inventory and preventive maintenance in an imperfect production system, Elsevier, Computers and Industrial Engineering 48(2005) 55-68, available Oct. 28, 2004.*
Fagan, et al., Facility Condition Assessments: More than Just Making a List, American Society for Healthcare Engineering, 34th Annual Conference & Technical Exhibition, Jul. 15, 1997.*

* cited by examiner

*Primary Examiner* — Johnna Loftis
*Assistant Examiner* — Brandi P Parker
(74) *Attorney, Agent, or Firm* — Dominic M. Kotab

(57) ABSTRACT

According to one embodiment, a computer program product for determining future facility conditions includes a computer readable medium having computer readable program code stored therein. The computer readable program code includes computer readable program code for calculating a time period specific maintenance cost, for calculating a time period specific modernization factor, and for calculating a time period specific backlog factor. Future facility conditions equal the time period specific maintenance cost plus the time period specific modernization factor plus the time period specific backlog factor. In another embodiment, a computer-implemented method for calculating future facility conditions includes calculating a time period specific maintenance cost, calculating a time period specific modernization factor, and calculating a time period specific backlog factor. Future facility conditions equal the time period specific maintenance cost plus the time period specific modernization factor plus the time period specific backlog factor. Other embodiments are also presented.

15 Claims, 1 Drawing Sheet

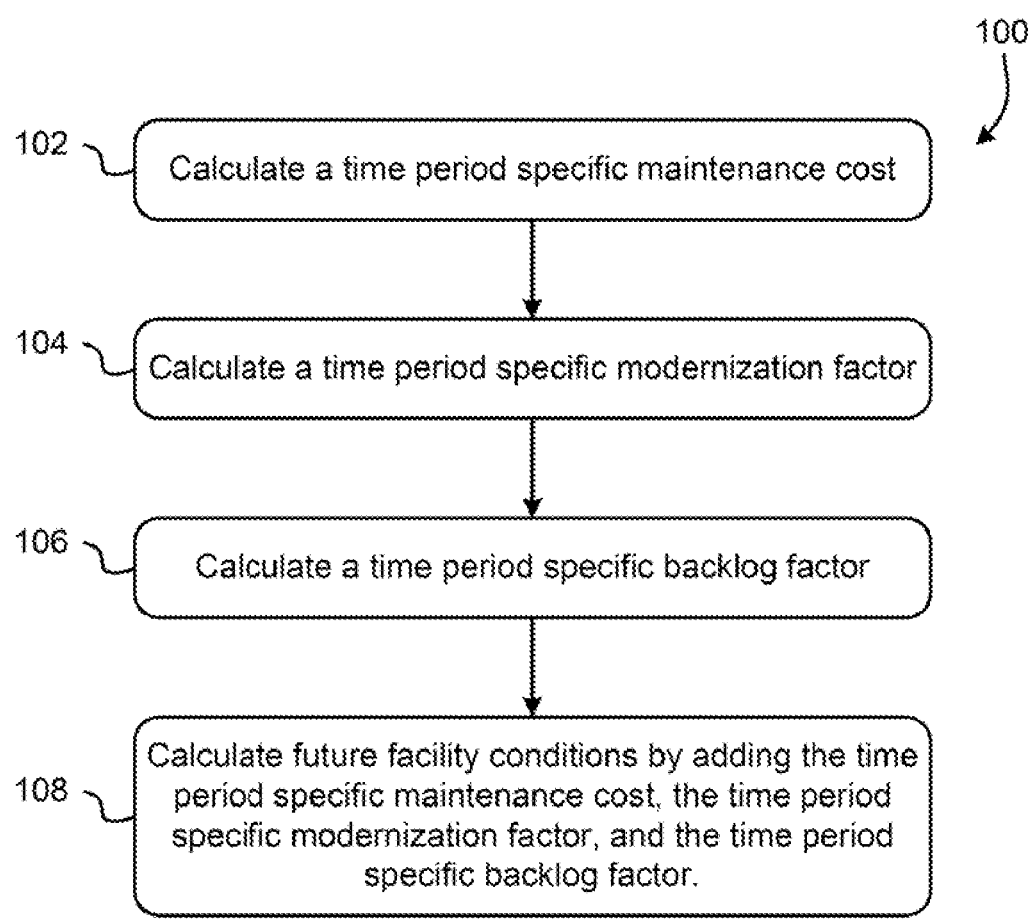

METHOD AND COMPUTER PROGRAM PRODUCT FOR MAINTENANCE AND MODERNIZATION BACKLOGGING

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to maintenance and backlogging activities, and more specifically, to facilities management funding activities.

BACKGROUND

The rate of degradation, deterioration, and failure of facilities and infrastructure over time is not well modeled or estimated by current techniques. Additionally, current techniques do not allow for successfully managing and/or predicting future facility conditions due to lack of research and information in this particular area. There exist some current predictive models which do not successfully account for all the variables and nuances of predicting future facility conditions.

Accordingly, it would be greatly beneficial to facility management, budgeting, and capital projects to be able to more accurately predict future facility conditions. In addition, being able to account for expected or known adaptation of facilities based on technological and code upgrades would also be useful.

SUMMARY

According to one embodiment, a computer program product for determining future facility conditions includes a computer readable medium having computer readable program code stored therein. The computer readable program code includes computer readable program code for calculating a time period specific maintenance cost, for calculating a time period specific modernization factor, and for calculating a time period specific backlog factor. Future facility conditions equal the time period specific maintenance cost plus the time period specific modernization factor plus the time period specific backlog factor.

In another embodiment, a computer-implemented method for calculating future facility conditions includes calculating a time period specific maintenance cost, calculating a time period specific modernization factor, and calculating a time period specific backlog factor. Future facility conditions equal the time period specific maintenance cost plus the time period specific modernization factor plus the time period specific backlog factor.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a flowchart of a method according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to one general embodiment, a computer program product for calculating future facility conditions comprises a computer readable medium having computer readable program code stored therein, the computer readable program code being for calculating a time period specific maintenance cost, for calculating a time period specific modernization factor, and for calculating a time period specific backlog factor, wherein future facility conditions equal the time period specific maintenance cost plus the time period specific modernization factor plus the time period specific backlog factor.

In another general embodiment, a computer-implemented method for calculating future facility conditions includes calculating a time period specific maintenance cost, calculating a time period specific modernization factor, and calculating a time period specific backlog factor, wherein future facility conditions equal the time period specific maintenance cost plus the time period specific modernization factor plus the time period specific backlog factor.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Of course, the methods and techniques described herein may be implemented in a system and/or computer program product. A system may include a processor and a computer readable medium (e.g., a memory, a disk, etc.) operatively coupled to the processor. The processor is operative to perform the various steps described herein, and possibly more.

Moreover, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a physical computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory, semiconductor memory (e.g., FLASH memory and other portable memory cards, etc.), etc.

The methods described herein may be used by institutional facility managers at any size of plant, production facility, research institute, university, etc. Some of the methods are particularly applicable to large-scale facilities management, such as those which can be found at the Department of Energy (DOE) Complex, National Nuclear Security Administration (NNSA), etc. The methods may be used to manage and budget public maintenance programs. The adaptation of existing buildings for current use, anticipated uses, and code compliance are collateral uses of some methods described herein. In addition, the methods may be used to construct budgets, make decisions about the allocation and employment of maintenance moneys, predict the impact of deferring maintenance, and analyze the potential for future building use and adaptation. Many other uses are also available, and these exemplary uses are not meant to be limiting in any fashion.

Deferred maintenance is a powerful tool for large scale facilities individually as well as systemically. It further allows an analysis to achieve recapitalization or modernization of aging facilities by identifying needed levels of maintenance and requisite funding for those levels. The methods for applying deferred maintenance presented herein, according to some embodiments, are flexible and easily validated by accounting for best industry practices and practical experience gleaned at the facility at which the methods are applied. Data may be collected and quantified over many years in order to verify the effectiveness of applying the methods described herein.

There are two concepts of a building's life, one of the major components in any facilities management scheme: the "Useful Life" and the "Productive Life."

The Useful Life of a building is limited by the durability of its systems. It does not fail as a whole, but by individual components. Maintenance funding maintains and renews building systems and components to keep buildings in acceptable condition for current use and achieve the expected building life.

The Productive Life of a building is limited by its continuing ability to meet the needs and mission of the institution or business using the building, which change over time. Modernization funds alter/adapt the building to comply with new regulations, changes in standards and technology, to meet new expectations, and to serve changes in mission, needs, or building use.

In order to effectively "maintain" a building, both the Useful Life and the Productive Life should receive funding, in order to address all factors which can lead to a building falling below expected performance abilities. The costs of modernization are different from, and in addition to, the costs of keeping a facility in good condition for its present use.

"Major Maintenance" is another term used in some embodiments, and it may be defined as the replacement of a system or component of a real property asset when that component has reached the end of its useful life. For example, the replacement of any of the following items would be considered Major Maintenance: a roofing system when the roofing system no longer reliably kept water from entering the building; a chiller that no longer provided the design cooling requirement; a paint system that no longer provided the amount of protection needed for the wood or metal that it covered; an exhaust fan that no longer reliably relieved exhaust fumes from the adjoining area, possibly due to wear and tear and/or aging, etc. The previous examples are not meant to be limiting on the types of systems and/or items which would be considered Major Maintenance in some embodiments. If these systems or components are not replaced when they no longer execute their duties (e.g., the maintenance is deferred to a future period), they are added to a group of maintenance known as "Maintenance Backlog."

According to some embodiments, "Maintenance Backlog," may be defined as any maintenance that was not accomplished when it became apparent that it was needed by the facility. Normally, not performing this type of maintenance will not cause the facility to shutdown entirely, but it may cause slower operation, less efficiency, more costly operation, etc.

Major Maintenance or the replacement of faulty systems/components is called Renewal, to differentiate it from preventive and minor maintenance.

The methods, according to some embodiments, utilize the concepts of Useful Life and Productive Life relative to buildings (permanent facilities). They may also utilize two fundamental indicators that were introduced by the APPA (Association of Higher Education Facilities Officers) to display results. According to Equation 1 below, the Facility Condition Index (FCI) is equal to the Deferred Maintenance (DM) divided by the Replacement Plant Value (RPV). The RPV is a standard industry and facilities management concept and is routinely used to establish a percentage for maintenance budget levels.

$$FCI = \frac{DM}{RPV} \qquad \text{Equation 1}$$

Equation 2 presents another concept, that of a Facility Needs Index (FNI), which is equal to the sum of the Deferred Maintenance (DM) and Modernization (M) divided by the Replacement Plant Value (RPV).

$$FNI = \frac{DM + M}{RPV} \qquad \text{Equation 2}$$

Methods described herein has been developed based on many years of data that has been collected at an actual running facility.

The methods, according to some embodiments, serve as a more precise and sophisticated device to establish maintenance levels and associated financial commitment, some of which may be critical to continued normal operations of the facilities.

Finer definition in the concept of "Deferred Maintenance" includes: "Essential Backlog" and its growth when maintenance funding levels are constant; "Backlog Reduction" to return a facility to a reasonable current condition and reliability; and "Modernization" to alter or adopt facilities to meet changing or evolving mission needs and external standards, commonly known as "Code Compliance."

The "Modernization" funding, according to some embodiments, may be set at about 0.5% of the Replacement Plant Value (RPV) and those funds spent on modernization tasks are counted to offset the Modernization funding. Any funding which is not offset is then counted in the total amount of Modernization Backlog.

The Maintenance Backlog has drawn the most attention in the field and a unique approach has been taken to the development of the maintenance model. A significant amount of data on the actual useful life of real property asset's systems/components (S/C's) was available for use in the development of models and/or formulae to approximate funding requirements of a facility. A database was available which showed the installation date of each S/C, when each S/C that had reached the end of its useful life should have been replaced, and when each S/C was actually replaced. Therefore, the model was developed using actual empirical data on the rate (as a % of RPV) that S/C's will, in the aggregate, reach the end of their useful life. Information was also available on the current age of S/C's that had not yet reached the end of their useful life. Based upon this relative wealth of information, a Renewal Rate of 0.38% of RPV was determined.

It has been determined that this Renewal Rate was much lower than renewal rates that were based on models that used published expected useful life criteria published by equipment manufacturers and trade/professional organizations. Their renewal rates were much closer to 0.8% to 1.0% of RPV. Further investigation showed that the expected useful life information appeared to be based on equipment failure, and did not take into account situations where the equipment had not yet failed, but was not operating at a level consistent with new equipment.

Thus the lower Renewal Rate of 0.38% of RPV was appropriate when equipment that had failed and equipment that had not yet failed was taken into consideration. This is a surprising and unique aspect of the techniques and systems described herein, according to some embodiments.

One funding model, which states that Maintenance/Renewal and Modernization should total 2.0% of RPV, is inadequate to fully anticipate Backlog demands and build-up. Specifically, this funding model does not include an estimated amount of money for which to reserve for Backlog reduction. Accordingly, the methods and products presented herein are capable, according to one embodiment, of providing this term such that a full calculation can be made and facility maintenance can be approximated precisely.

According to some embodiments, the Backlog portion of a funding model may be represented according to the two following equations, Equation 3 and Equation 4.

$$B_{(y+1)} = B_y + B_g - f_i B_r \quad \text{Equation 3}$$

$$B_r = f_f F + MR_s + P + GA + D + f_{li} LI + f_g GPP \quad \text{Equation 4}$$

In Equation 3, an estimation of the next time period's backlog, $B_{(y+1)}$ is the backlog for the next time period (e.g., next year, next month, next quarter, etc.), $B_y$ is the backlog for the current time period (e.g., this year, this month, this quarter, etc.), $B_r$ is the backlog growth as represented in Equation 4 and Equation 5, and $f_i$ is the integration factor. The Integration Factor ($f_i$) considers what portion of the funding actually reduces the maintenance backlog, e.g., it is a factor which takes into account the effectiveness of the funding's ability to reduce backlog.

The backlog reduction ($B_r$) shown in Equation 4 is made up of the reduction in backlog that results from a number of funding streams, the reduction of backlog due to demolition (D), and the backlog reduction due to reinvestment using normal maintenance funding at a particular site. The Funding Streams shown in Equation 4 (F, P, GA, LI, GPP) were funding streams that were available from the Federal Government and the Department of Energy (DOE) at the time that the data was collected. F is the FIRP backlog reduction funding, P is the program funded backlog reduction, GA is the G&A funded backlog reduction, LI is the line item funded backlog reduction, and GPA is the 1GGP/GPP funded backlog reduction. The Funding Factors for Loads ($f_f$, $f_{li}$, $f_g$) are used to account for funding amounts and the Backlog Reduction amounts being compatible. Many organizations add a factor or burden to "incoming" funds to generate a resultant funding for Overhead or G&A purposes. Often, different burdens can be added, depending upon the type or source of the funding stream. The Funding Factors for Loads equalize the funding amounts so that they are compatible.

In another embodiment, each individual funding stream may be represented as a single variable, Funding Stream n ($FS_n$), where n is an integer and $FS_1$ is the first funding stream, $FS_2$ is the second funding stream, etc. Each funding stream is multiplied by a Funding Factor for Loads ($f_n$) for each funding stream n. What the funding streams are called and how many are available depends upon the company and industry/organization. A simplified Backlog Reduction equation is represented by Equation 5.

$$B_y = \sum_n f_n FS_n + MR_s + D \quad \text{Equation 5}$$

Another term which is useful in maintenance management, according to some approaches, is "Essential Backlog," which is a way to identify the most important deficiencies to correct that are included in the overall Maintenance Backlog. According to one embodiment, Essential Backlog is represented by the following Equation 6.

$$EB_x = EB_{(y-1)} + f_{em}(B_{(x-1)} - EB_{(y-1)}) + f_{eg}B_g - f_{er}B_r \quad \text{Equation 6}$$

In Equation 6, $EB_y$ is the essential backlog for the current time period (for example, this year, this month, this quarter, etc.), $EB_{(y-1)}$ is the essential backlog for the last time period (for example, last year, last month, last quarter, etc.), $B_{(y-1)}$ is the backlog for the last time period (for example, last year, last month, last quarter, etc.), $B_g$ is the backlog growth (estimated), $B_r$ is the backlog reduction, as presented in Equation 5, $f_{em}$ is the factor for nonessential backlog migrating to essential backlog, $f_{eg}$ is the factor for obtaining the essential portion of the backlog growth, and $f_{er}$ is the factor for obtaining the amount of backlog reduction ($B_r$) which is applied toward reducing essential backlog. Equation 6 projects how the essential backlog will grow or shrink over time. The factors ($f_x$) determine the rate of migration, the portion of new backlog that is essential, and what portion of the backlog reduction would be applied to essential deficiencies. A high percentage of the backlog reduction may be applied to essential deficiencies, but not necessarily all of it. Deficiencies that are not considered essential can be eliminated and/or corrected by demolition, capital project funding, targets of opportunity, etc.

Now referring to FIG. 1, a method 100 for calculating future facility conditions is described according to one embodiment. The method is computer-implemented and may be executed in any desired environment, including those described herein.

In operation 102, a time period specific maintenance cost is calculated. For example, the time period may be one year (annual), one month (monthly), one quarter (quarterly), etc.

In operation 104, a time period specific modernization factor is calculated. For example, the time period may be one year (annual), one month (monthly), one quarter (quarterly), etc.

In operation 106, a time period specific backlog factor is calculated. For example, the time period may be one year (annual), one month (monthly), one quarter (quarterly), etc.

In operation 108, future facility conditions are calculated by adding the time period specific maintenance cost, the time period specific modernization factor, and the time period specific backlog factor.

In some approaches, the method 100 may further include calculating a Replacement Plant Value (RPV) for the facility. The RPV may be calculated using any known technique in the art. Further, the time period specific maintenance cost may be on an annual basis, and may be calculated as between about 1.0% of RPV and about 5.0% of RPV.

Also, in some approaches, the time period specific modernization factor may be on an annual basis, and may be calculated as between about 0.2% of RPV and about 1.5% of RPV.

In some embodiments, the time period specific backlog factor may be calculated according to Equation 3, presented previously. In addition, the backlog reduction may be calculated according to Equation 5, presented previously.

Also, in some approaches, the annual backlog factor may be calculated to include only the essential backlog, and may be calculated according to Equation 6, presented previously.

Of course, in some embodiments, the above described method may be carried out using a computer. The computer may include a processor for executing computer readable program code and a computer readable medium having stored therein computer readable program code.

In more approaches, a computer program product may include a computer readable medium having stored therein computer readable code for executing the above described method.

According to some embodiments, the methods and products described herein may be particularly useful for constructing more accurate budgets, making decisions about the allocation and employment of maintenance money, predicting the impact of deferring maintenance, analyzing the potential for future building use and adaptation, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for determining future facility conditions, the computer program product comprising:

a computer readable medium having non-transitory computer readable program code stored therein, the computer readable program code comprising:

computer readable program code for calculating a time period specific maintenance cost;

computer readable program code for calculating a time period specific modernization factor;

computer readable program code for calculating a time period specific backlog factor, and computer readable program code for calculating a Replacement Plant Value (RPV) for the facility;

wherein future facility conditions equal the time period specific maintenance cost plus the time period specific modernization factor plus the time period specific backlog factor, and wherein the time period specific maintenance cost is on an annual basis and is calculated as between about 1.0% of RPV and about 5.0% of RPV.

2. The computer program product of claim 1, wherein the time period specific modernization factor is on an annual basis and is calculated as between about 0.2% of RPV and about 1.5% of RPV.

3. The computer program product of claim 1, wherein the time period specific backlog factor is calculated according to a formula, wherein the formula is:

$$B_{(y+1)} = B_y + B_g - f_i \cdot B_r,$$

where $B_{(y+1)}$ is an annual backlog factor for a next time period,
$B_y$ is a backlog for the current time period,
$f_i$ is an integration factor, and
$B_r$ is a backlog reduction.

4. The computer program product of claim 3, wherein the backlog reduction is calculated according to a formula, wherein the formula is:

$$B_y = \sum_n f_n FS_n + MR_s + D,$$

where $MR_S$ is site backlog reinvestment,
D is backlog eliminated by demolition,
$FS_n$ is a funding stream available for funding backlog reduction, and
$f_n$ is a funding factor for loads for each funding stream.

5. The computer program product of claim 3, wherein the backlog for the current time period is calculated as essential backlog according to a formula, wherein the formula is:

$$EB_y = EB_{(y-1)} + f_{em}(B_{(x-1)} - EB_{(y-1)}) + f_{eg}B_g - f_{er}B_r,$$

where $EB_y$ is the essential backlog for the current time period,
$EB_{(y-1)}$ is the essential backlog for the last time period,
$B_{(y-1)}$ is the backlog for the last time period,
$B_g$ is the backlog growth,
$B_r$ is the backlog reduction,
$f_{em}$ is the factor for nonessential backlog migrating to essential backlog, $f_{eg}$ is the factor for obtaining the essential portion of the backlog growth, and
$f_{er}$ is the factor for obtaining the amount of backlog reduction which is applied toward reducing essential backlog.

6. The computer program product of claim 5, wherein the backlog reduction is calculated according to a formula, wherein the formula is:

$$B_y = \sum_n f_n FS_n + MR_s + D,$$

where
- $MR_S$ is site backlog reinvestment,
- D is backlog eliminated by demolition,
- $FS_n$ is a funding stream available for funding backlog reduction, and
- $f_n$ is a funding factor for loads for each funding stream.

7. A computer-implemented method for calculating future facility conditions, the method comprising:
    calculating, using a processor, a time period specific maintenance cost;
    calculating a time period specific modernization factor;
    calculating a time period specific backlog factor;
    calculating, using the processor, a Replacement Plant Value (RPV) for the facility; and
    storing at least one of: the time period specific maintenance cost, the time period specific modernization factor, the time period specific backlog factor, and the RPV on a non-transitory computer readable storage medium,
    wherein future facility conditions equal the time period specific maintenance cost plus the time period specific modernization factor plus the time period specific backlog factor, and
    wherein the time period specific modernization factor is on an annual basis and is calculated as between about 0.2% of RPV and about 1.5% of RPV.

8. The computer-implemented method of claim 7, wherein the time period specific maintenance cost is on an annual basis and is calculated as between about 1.0% of RPV and about 5.0% of RPV.

9. The computer-implemented method of claim 8, wherein the time period specific backlog factor is calculated according to a formula, wherein the formula is:

$$B_{(y+1)} = B_y + B_g - f_i \cdot B_r,$$

where
- $B_{(y+1)}$ is an annual backlog factor for a next time period,
- $B_y$ is a backlog for the current time period,
- $f_i$ is an integration factor, and
- $B_r$ is a backlog reduction.

10. The computer-implemented method of claim 9, wherein the backlog reduction is calculated according to a formula, wherein the formula is:

$$B_y = \sum_n f_n FS_n + MR_s + D,$$

where
- $MR_S$ is site backlog reinvestment,
- D is backlog eliminated by demolition,
- $FS_n$ is a funding stream available for funding backlog reduction, and
- $f_n$ is a funding factor for loads for each funding stream.

11. The computer-implemented method of claim 9, wherein the backlog for the current time period is calculated as essential backlog according to a formula, wherein the formula is:

$$EB_y = EB_{(y-1)} + f_{em}(B_{(x-1)} - EB_{(y-1)}) + f_{eg}B_g - f_{er}B_r,$$

where
- $EB_y$ is the essential backlog for the current time period,
- $EB_{(y-1)}$ is the essential backlog for the last time period,
- $B_{(y-1)}$ is the backlog for the last time period,
- $B_g$ is the backlog growth,
- $B_r$ is the backlog reduction,
- $f_{em}$ is the factor for nonessential backlog migrating to essential backlog,
- $f_{eg}$ is the factor for obtaining the essential portion of the backlog growth, and
- $f_{er}$ is the factor for obtaining the amount of backlog reduction which is applied toward reducing essential backlog.

12. The computer-implemented method of claim 11, wherein the backlog reduction is calculated according to a formula, wherein the formula is:

$$B_y = \sum_n f_n FS_n + MR_s + D,$$

where
- $MR_S$ is site backlog reinvestment,
- D is backlog eliminated by demolition,
- $FS_n$ is a funding stream available for funding backlog reduction, and $f_n$ is a funding factor for loads for each funding stream.

13. A computer-implemented method for calculating future facility conditions, the method comprising:
    calculating a time period specific maintenance cost;
    calculating a time period specific modernization factor;
    calculating a time period specific backlog factor;
    calculating, using a processor, a Replacement Plant Value (RPV) for the facility;
    calculating, using the processor, a Facility Needs Index (FNI) for the facility; and
    storing at least one of: the time period specific maintenance cost, the time period specific modernization factor, the time period specific backlog factor, the RPV and the FNI on a computer readable storage medium,
    wherein future facility conditions equal the time period specific maintenance cost plus the time period specific modernization factor plus the time period specific backlog factor.

14. The computer-implemented method as recited in claim 13, wherein the FNI is calculated according to a formula, wherein the formula is:

$$FNI = \frac{DM + M}{RPV}$$

wherein DM is the time period specific maintenance cost, and wherein M is the time period specific modernization factor.

15. The computer-implemented method as recited in claim 13, further comprising calculating a maintenance budget based at least in part on the FNI.

* * * * *